United States Patent
Miyamoto et al.

(10) Patent No.: US 6,668,865 B2
(45) Date of Patent: Dec. 30, 2003

(54) ROTARY HOLDER FOR CORRUGATED TUBE

(75) Inventors: Masaji Miyamoto, Shizuoka-ken (JP); Hiroyuki Wakamatsu, Aichi-ken (JP); Tadashi Muraoka, Kagoshima-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/292,445

(22) Filed: Nov. 13, 2002

(65) Prior Publication Data

US 2003/0116215 A1 Jun. 26, 2003

(30) Foreign Application Priority Data

Nov. 14, 2001 (JP) ........................................ 2001-348942

(51) Int. Cl.[7] ................................................ F16L 55/00
(52) U.S. Cl. ........................ 138/108; 138/110; 138/156; 248/74.4; 285/419; 174/92
(58) Field of Search ................................ 138/110, 108, 138/109, 156; 248/74.4, 73, 74.1; 285/419, 903; 174/92

(56) References Cited

U.S. PATENT DOCUMENTS 3,711,633 A * 1/1973 Ghirardi et al. ............ 174/135
4,470,622 A * 9/1984 Pate et al. ................... 285/419
4,478,278 A * 10/1984 Klein .......................... 166/105
6,085,795 A   7/2000 Ogawa et al. ............... 138/108
6,595,473 B2 * 7/2003 Aoki et al. .................. 248/74.4
2003/0102142 A1 * 6/2003 Miyamoto et al. .......... 174/52.1

FOREIGN PATENT DOCUMENTS

| EP | 1312511 A1 * | 5/2003 | ........... B60R/16/02 |
| EP | 1312845 A1 * | 5/2003 | ........... F16L/03/16 |
| JP | 008922 | 1/1999 | |
| JP | 002364 | 1/2000 | |
| JP | 197244 | 7/2000 | |

* cited by examiner

Primary Examiner—Patrick Brinson
(74) Attorney, Agent, or Firm—Finnegan, Henderson, Farabow, Garrett & Dunner, L.L.P.

(57) ABSTRACT

By attaching a base portion to a cover portion formed is an outer fixing body and in the interior of the outer fixing body a corrugated tube is rotatably received. Further, by providing a tube bend restraint portion at the end portion of the cover portion for restraining bend of the corrugated tube within the given range, a rotary holder for corrugated tube in which the range of sliding movement of the corrugated tube is defined only within the cover portion.

3 Claims, 7 Drawing Sheets

ROTARY HOLDER FOR CORRUGATED TUBE

BACKGROUND OF THE INVENTION

1. Field of the Invention

The present invention relates to a rotary holder for corrugated tube holding rotatably a corrugated tube in which a wire harness is received.

2. Description of the Related Art

In the interior of a slide door used on a one-box car mounted are automotive electric equipments such as a power window motor, a door lock unit, or speaker. A wire harness is' wired up between a vehicle body and the sliding door, in order to supply electric power from the vehicle body to these automotive electric equipments and to exchange control signals between the automotive electric equipments and the vehicle body. Wiring up the wire harness at the site requires that such a structure as to correspond to opening and closing of the sliding door is employed. A rotary holder for corrugated tube has been conventionally used as a part for wiring up the wire harness in corresponding to the opening and closing of the sliding door.

Figure 1:
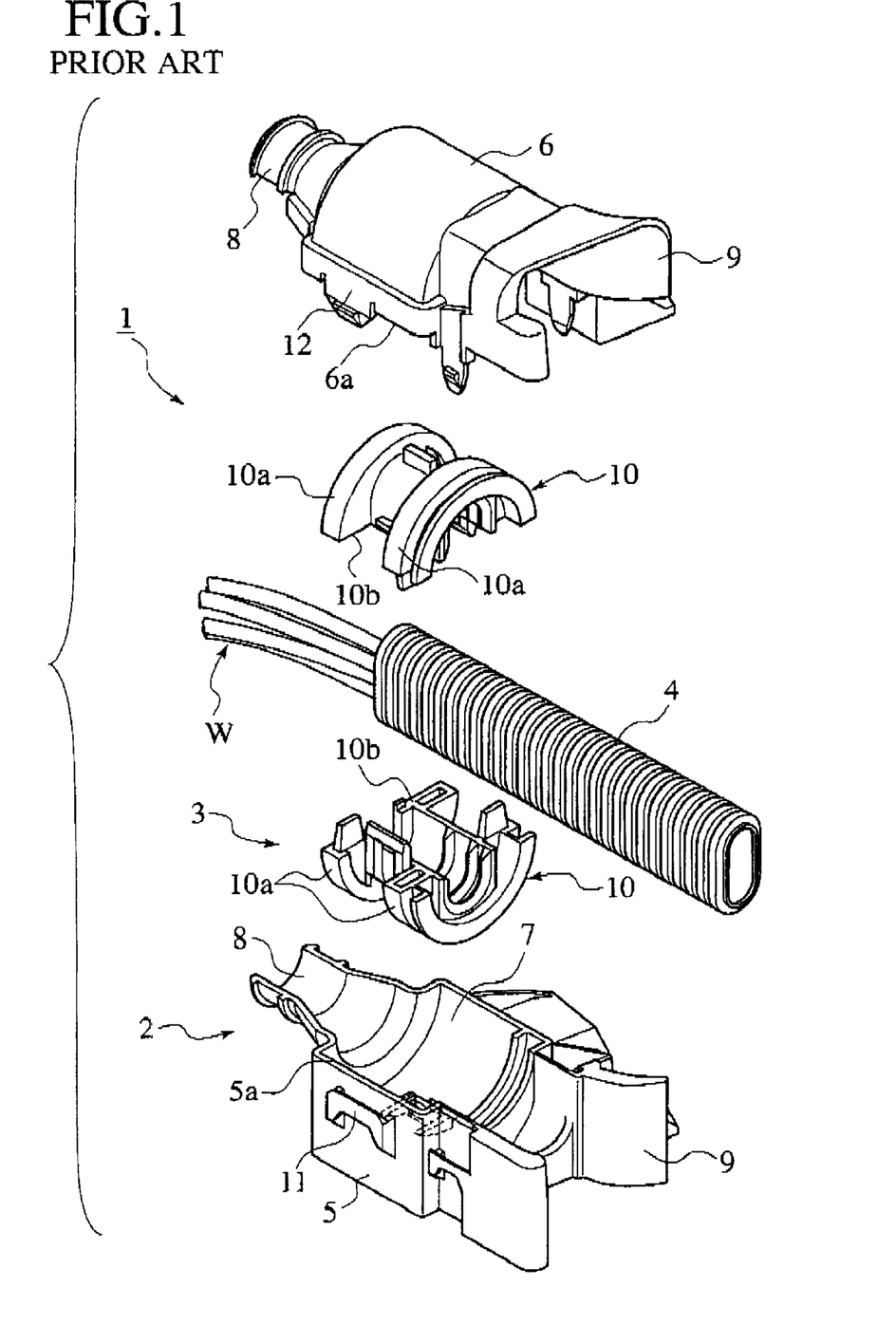
FIG. 1 is an exploded perspective view of an example of a conventional rotary holder for corrugated tube.
Figure 2:
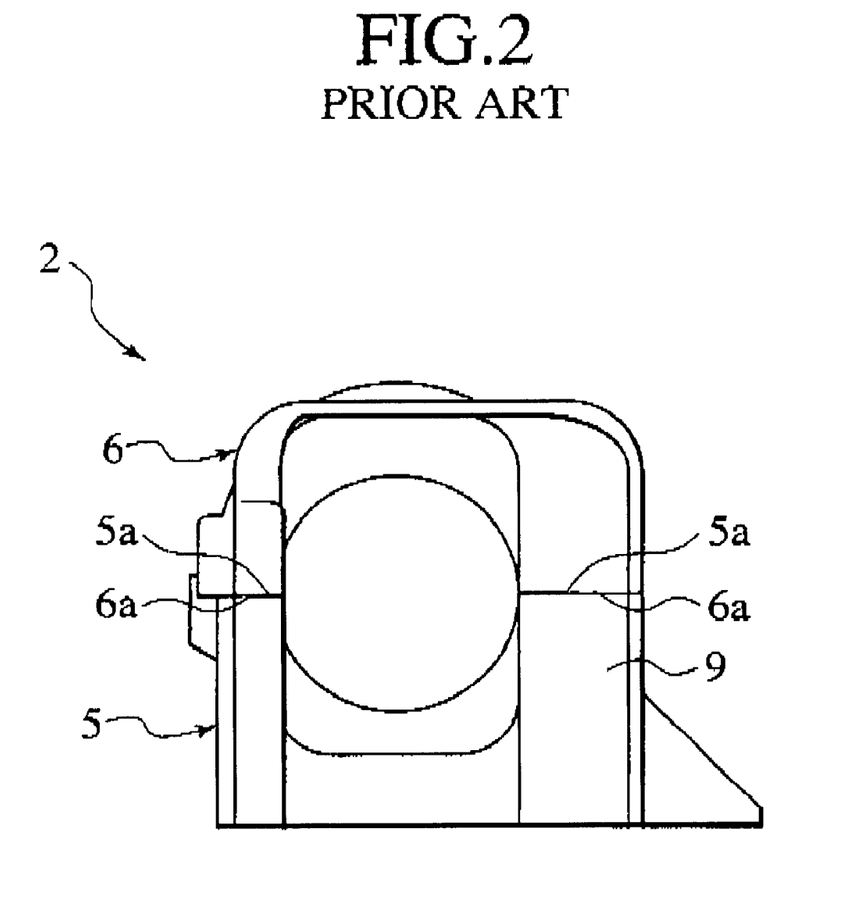
FIG. 2 is a front view of the example of a conventional rotary holder for corrugated tube.
Figure 3:
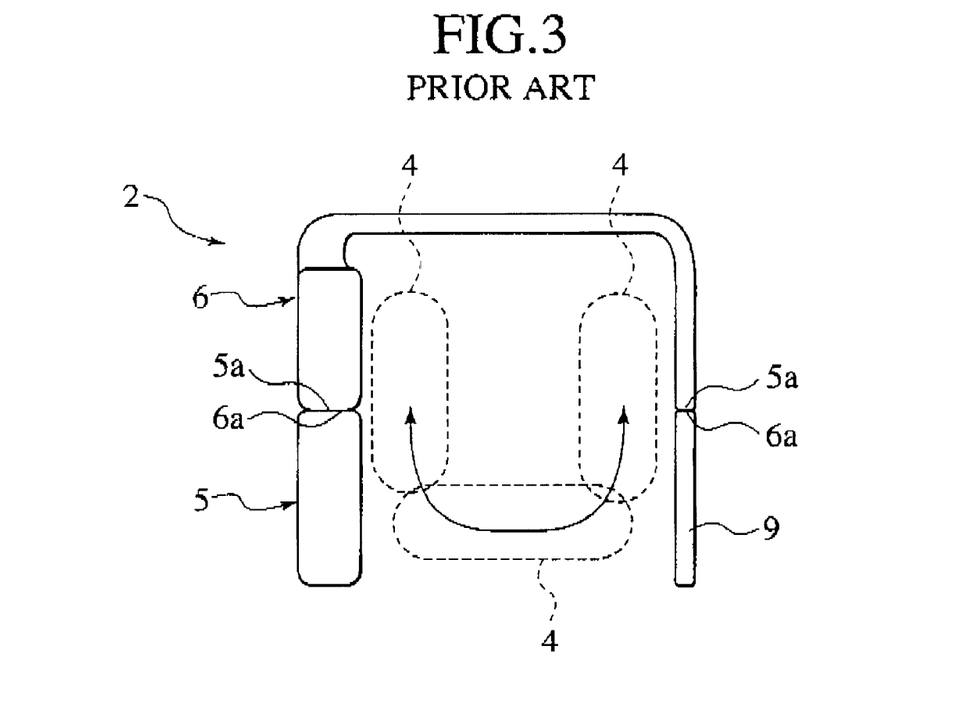
FIG. 3 is an illustrative view showing a locus of movement of a corrugated tube within the interior of a tube bend restraint portion of the example of a conventional rotary holder for corrugated tube.

A rotary holder for corrugated tube shown in FIGS. 1–3 has been conventionally known. The rotary holder for corrugated tube 1 is composed of, as shown in FIGS. 1 and 2, an outer fixing body 2 and an inner rotary body S received rotatablly in the interior of the outer fixing body 2. In the interior of the inner rotary body 3 held is a corrugated tube 4 containing a wire harness W therein.

As shown in FIG. 1 and FIG. 2, by butting a butt surface 5a of a base member 5 to a butt surface 6a of a cover 6, the outer fixing body 2 is assembled. At the center of the outer fixing body 2 formed is an inner rotary chamber 7 At the one end portion of the outer fixing body 2 provided is a harness support portion 8 for receiving the wire harness W having appeared from the interior of the corrugated tube. Further, at the other end 5 portion of the outer fixing body 2 provided is a tube bend restraint portion 9 for receiving the corrugated tube 4 and also for exposing the corrugated tube 4 to the exterior of the outer fixing body 2. And, the wire harness W appearing from the harness support portion 8 is wired up to a vehicle body (not shown in the figure), and the wire harness W within the corrugated tube 4 appearing from the tube bend restraint portion 9 is wired up to a sliding door (not shown in the figure).

As shown in FIG. 1, the inner rotary body 3 is composed of a pair of divided rotary member 10, 10 in the shape of a semi-cylinder having round arch surfaces 10a on the outer circumference of itself. By butting a butt surface 10b of one divided rotary member 10 to a butt surface 10b of the other divided rotary member 10, the inner rotary body 3 is assembled. The inner rotary body 3 is received rotatably within the inner rotary chamber 7 of the outer fixing body 2, holding the corrugated tube 4 within the interior of the inner rotary body 3.

When a wiring path of the corrugated tube 4 is varied due to opening and closing motion of the sliding door under the above configuration, movement of the corrugated tube 4 is restrained by the tube bend restraint portion 9 of the outer fixing body 2. Thereby, the corrugated tube 4, as shown by the arrow in FIG. 3, rotates and bends within the interior of the tube bend restraint portion 9, sliding on the inner surface of the tube bend restraint portion 9. Through such movement of the corrugated tube 4, the sliding door is opened and closed smoothly, and damage of the corrugated tube 4 and the wire harness W in the corrugated tube 4 is also reduced when opening and closing the sliding door.

Figure 4:
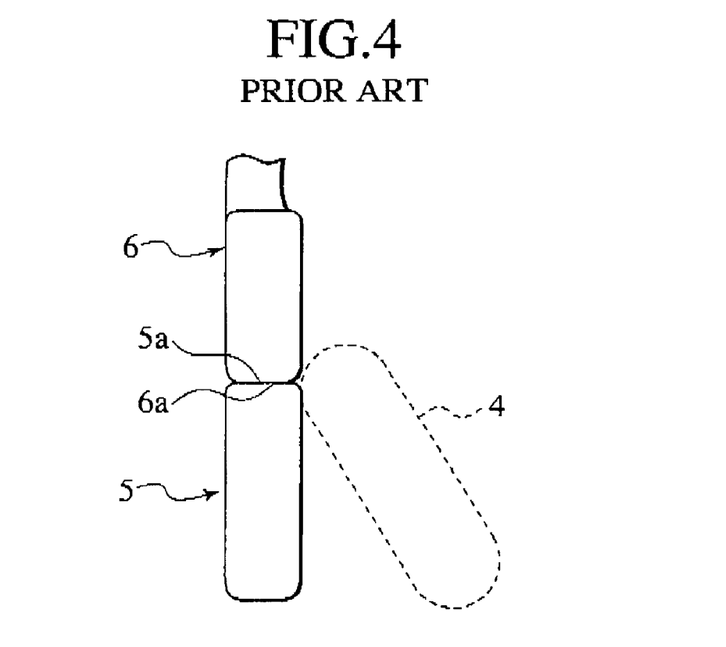
FIG. 4 is an illustrative view showing a state where the example of the conventional corrugated tube is sticking to an indentation portion formed at the site where a butt surface 5a of a base member 5 is engaged with a butt surface 6a of a cover 6.

However, in the conventional rotary holder for corrugated tube, since the butt surfaces 5a and 6a of the base member 5 and the cover 6 respectively composing the outer fixing body 2 are disposed on the inner surface of the tube bend restraint portion 9 of the outer fixing body 2 and also in the tube slide area on which the corrugated tube 4 slides, it has been liable to occur that the corrugated tube may strike, during sliding movement of the corrugated tube 4, against an indentation portion formed at the site where the butt surfaces 5a and 6a are engaged, and smooth sliding of the corrugated tube 4 may be prevented as shown in FIG. 4.

Further, it has been also liable to occur that the butt surface 5a of the base member 5 may displace from the butt surface 6a of the cover 6 due to failure of locking means 11 and 12 provided on the base member 5 and the cover 6, respectively. And it has been still liable that once the displacement between the butt surfaces 5a and 6a occur, a dislocation may be generated in an indentation portion formed at the site where the butt surface 5a of the base member 5 is engaged with the butt surface 6a of the cover 6, and the smooth sliding of the corrugated tube may further be prevented.

SUMMARY OF THE INVENTION

The present invention aims to provide a rotary holder for corrugated tube wherein the corrugated tube can always move smoothly on an inner surface of a tube bend restraint portion of an outer fixing body.

In order to attain the above object, the present invention provides a rotary holder for corrugated tube, comprising: an outer fixing body formed by assembling a cover portion onto a base member, receiving rotatablly a corrugate tube; and a tube bend restraint portion provided at the end portion of the outer fixing body, for restraining a bend of the corrugated tube within a given range; wherein a tube slide area in which the corrugated tube slides on an inner surface of the tube bend restraint portion is formed only in either the base member or the cover portion.

DESCRIPTION OF THE PREFERRED EMBODIMENTS

In the following, an embodiment of the present invention will be explained on the basis of the drawings.

As shown in FIG. 5–FIG. 8A, a rotary holder for corrugated tube 20 is composed of an outer fixing body 21 and an inner rotary body 22 received rotatablly in the interior of the outer fixing body 21. In the interior of the inner rotary body 22 held is a corrugated tube 23 containing a wire harness W. Here, the rotary holder for corrugated tube 20 is fixed to either a vehicle body (not shown in the figures) or a sliding door (not shown in the figures).

Figure 5:
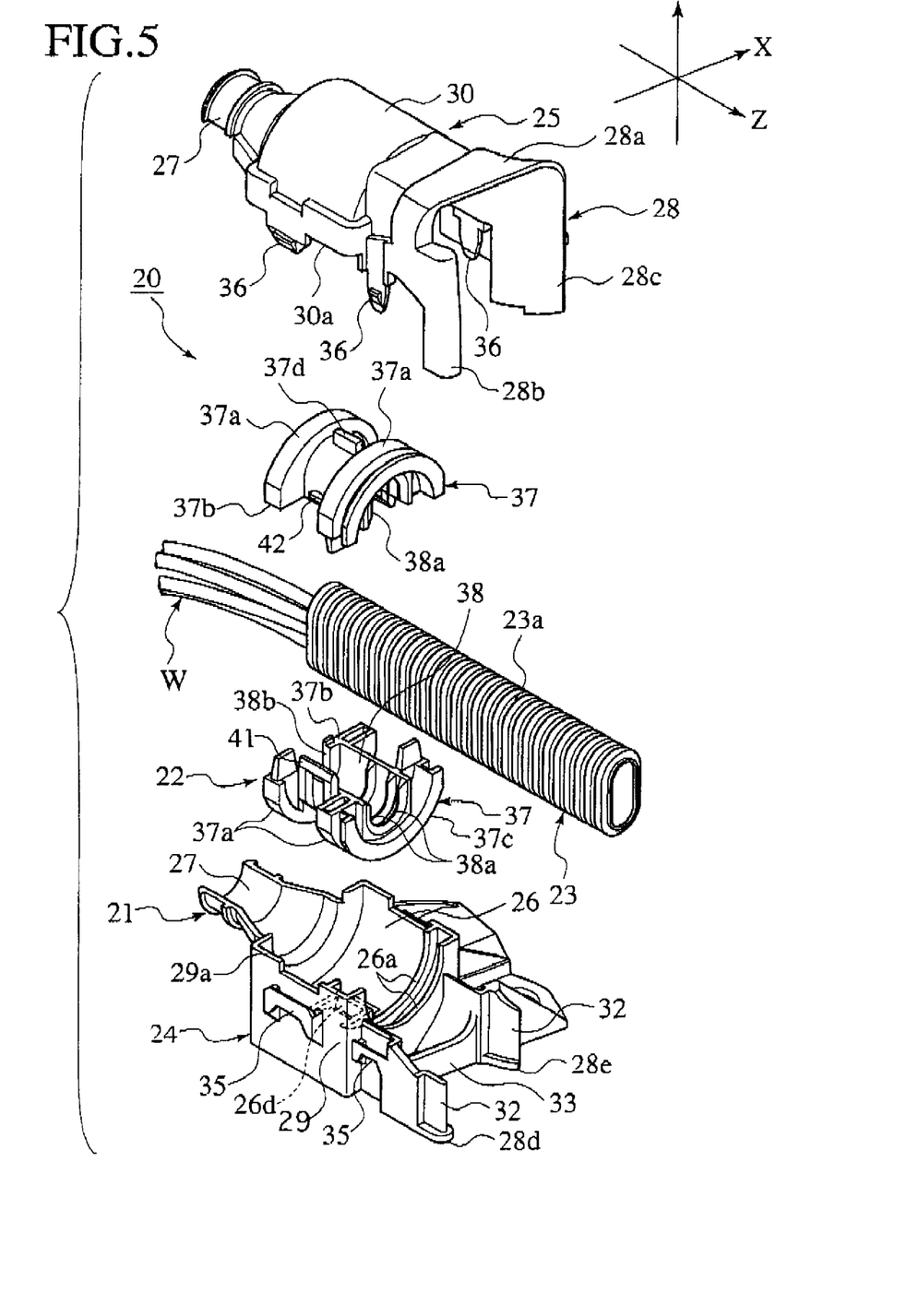
FIG. 5 is an exploded perspective view of an embodiment of the rotary holders for corrugated tube according to the present invention.
Figure 6:
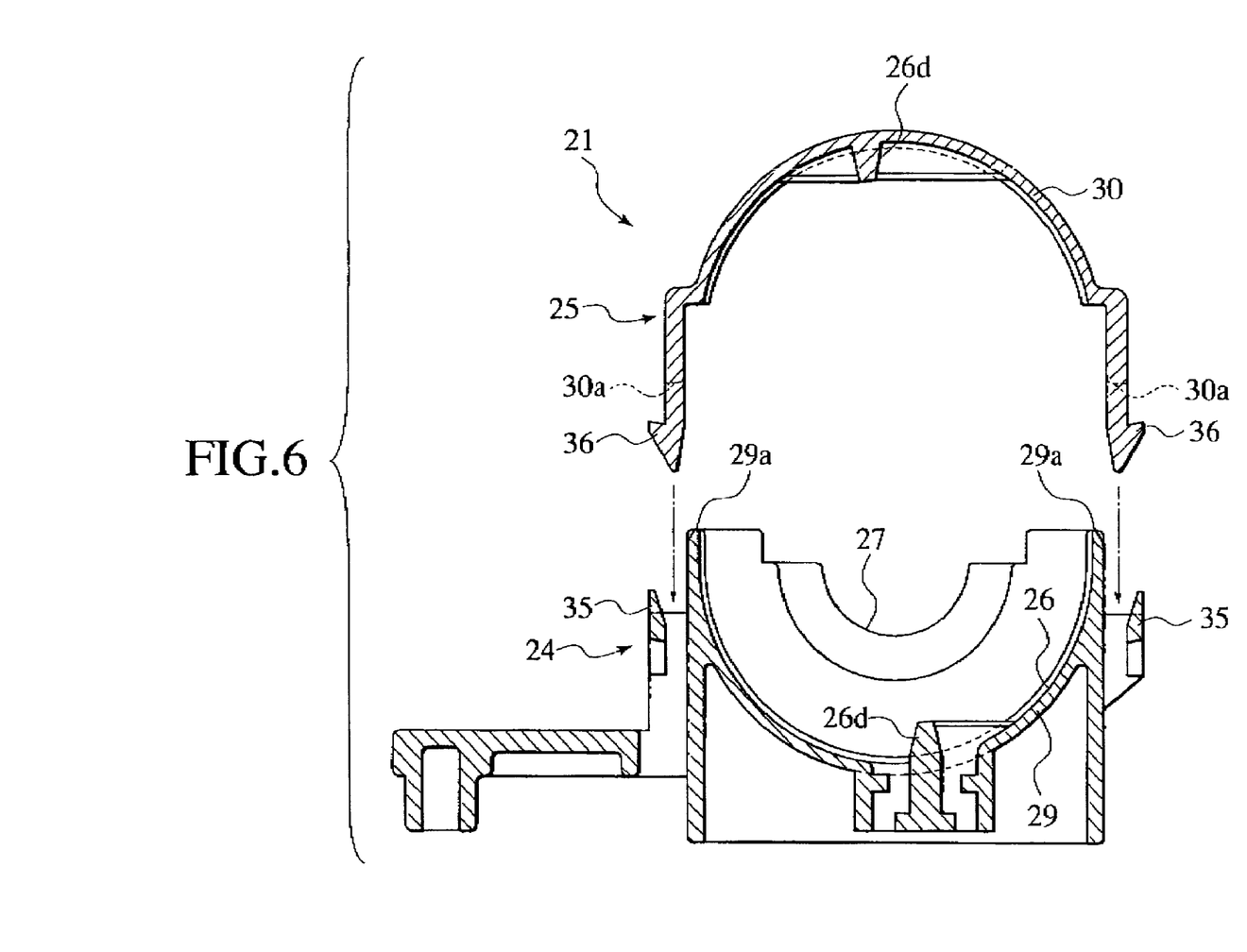
FIG. 6 is an exploded cross-sectional view of an embodiment of the outer fixing bodies according to the present invention.

The outer fixing body 21 is composed of a base member 24 made of synthetic resin and a cover 25 made of synthetic resin. As shown in FIG. 5 and FIG. 6, the outer fixing body 21 is formed by attaching the cover 25 onto the base member 24. The base member 24 has an inner rotary chamber (inner rotary portion) 26, a harness support portion 27, and a lower reception case portion 29 which forms a lower half of a tube bend restraint portion 28. The upper edge surface of the lower reception case portion 29 is a butt surface 29a. The cover 25 has an inner rotary chamber 26, a harness support portion 27, and a upper reception case portion 30 which forms a upper half of a tube bend restraint portion 28. The lower edge surface of the upper reception case portion 30 is a butt surface 30a. By butting the butt surface 30a of the cover 25 to the butt surface 29a of the base member 24, the base member 24 is attached to the cover 25. Accordingly, at the center of the outer fixing body 21 formed is the inner rotary chamber 26, and at the one end portion of the outer fixing body 21 formed is the harness support portion 27, and at the other end portion of the outer fixing body 21 formed is the tube bend restraint portion 28.

In the interior of the inner rotary chamber 26 received rotatably is the inner rotary body 22. The harness support portion 27 is formed in the shape of a cylinder having a diameter a little bit larger than that of the wire harness W, and receives the wire harness W having appeared from the interior of the corrugated tube 23 within the interior of the harness support portion 27. And the wire harness appearing from the interior of the harness support portion 27 is wired up to the vehicle body.

Figure 8A:
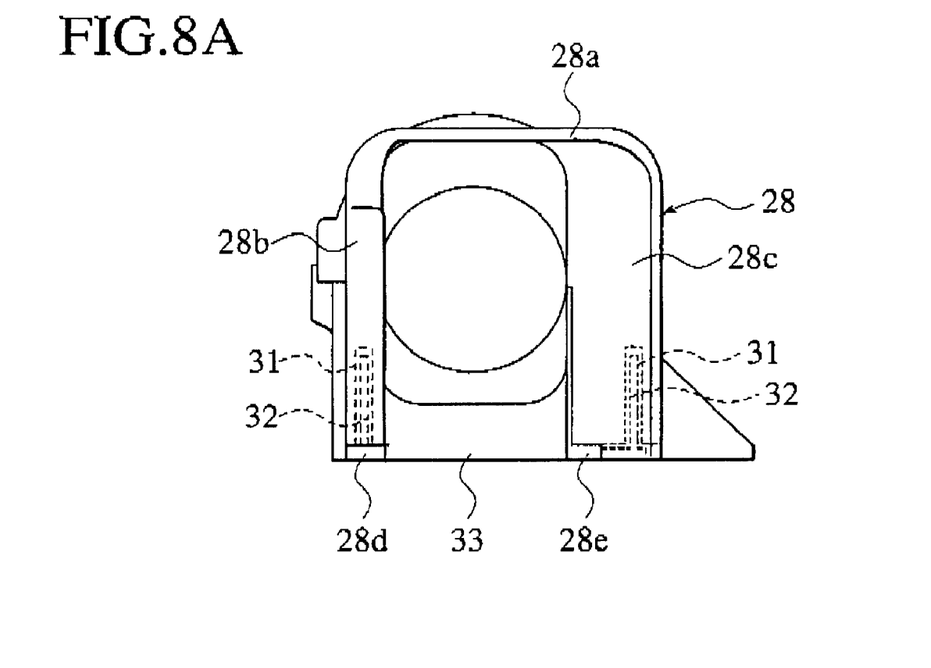
FIG. 8A is a front view of an embodiment of the rotary holders for corrugated tube according to the present invention.
Figure 8B:
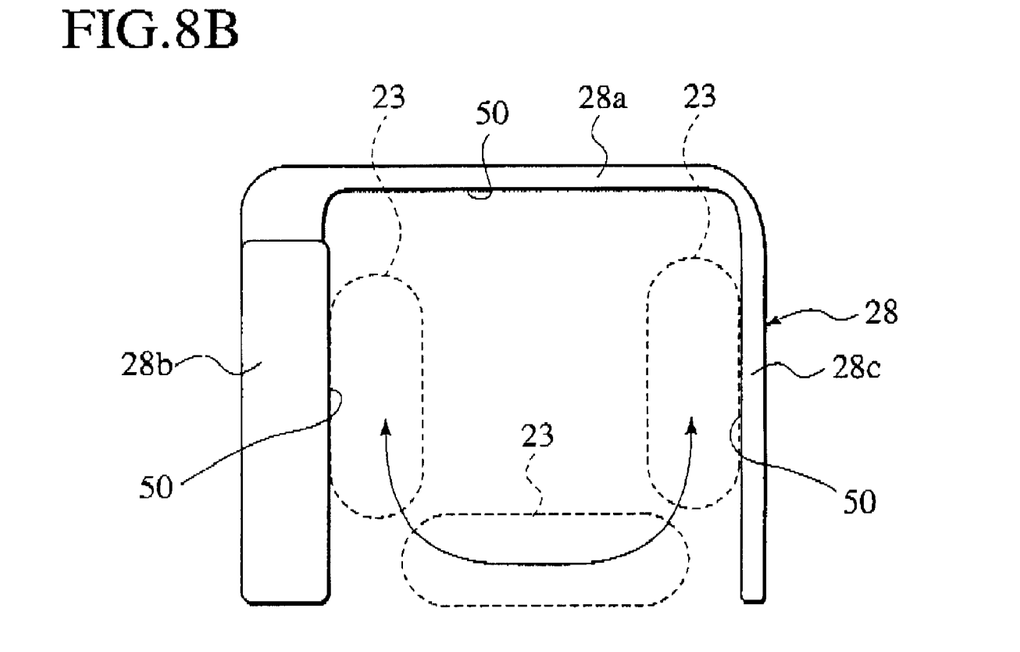
FIG. 8B is an illustrative view showing a locus of movement of a corrugated tube in a tube slide area adjacent to the tube bend restraint portion of an embodiment of the rotary holders for corrugated tube according to the present invention.

As shown in FIG. 5 and FIG. 8B, the corrugated tube 23 is received in the tube bend restraint portion 28. Further, the wire harness W contained in the corrugated tube 23 appearing from the tube bend restraint portion 28 is wired up to the sliding door. The tube bend restraint portion 28 is in the shape of an inverse U large enough in the direction of the Y-axis to correspond to the larger diameter (in the direction of Y-axis) of the corrugated tube 23. Additionally, the tube bend restraint portion 28 allows the corrugated tube 23 to rotate (movement) and also restrains bending of the corrugated tube 23 within the given range.

Further, the tube bend restraint portion 28 is formed from the upper reception case portion 30 and the lower reception case portion 29. The upper reception case portion 30 forms all of a top surface portion 28a, and almost all of right and left side surface portions 28b, 28c. Since the right and left side surface portions 28b, 28c of the upper reception case portion 30 are formed extending downward (in the direction of Y-axis) more than the conventional side surface portion, a tube slide area 50 where the corrugated tube 23 slides on the inner surface of the tube bend restraint portion 28 is formed only from the cover 25. That is to say, in the tube bend restraint portion 28, the butt surface 29a of the base member 24 is attached to the butt surface 30a of the cover 25 outside of the tube slide area 50. Concretely, the inner surface of one side surface portion 28b of the upper reception case portion 30 is formed as a straight surface extending almost straight in the outward direction (in the direction of Z-axis) from the interior of the tube bend restraint portion 28. Further, the inner surface of the other side surface portion 28c of the upper reception case portion 30 is formed as a taper surface gradually widening transversely (in the direction of X-axis) as it goes outward from the interior of the tube bend restraint portion 28. Still further, as shown in FIG. 8A, in the interiors of the right and left side surface portions 28b, 28c of the upper reception case portion 30, formed are engagement channels 31, 31 respectively having a cross-section nearly in the shape of a V which channel their way from the center portion of the side surface portions 28b, 28c to the bottom openings. Additionally, in a rotary holder for corrugated tube to be used for the sliding door on the opposite side, the location of the side surface portion 28b forming a straight surface and the location of the side surface portion 28c forming a taper surface are reversed.

As shown in FIG. 5 and FIG. 5A, in the lower reception case portion 29 provided are the lowest portions 28d, 28e forming the lowest edges of the right and left side surface portions 28b, 28c. In the right and left lowest portions 28d, 28e, a pair of engagement protrusions 32, 32 extruding upward are formed so as to extrude as the integral parts. Under the condition where the base member 24 is attached to the cover 25, the engagement protrusions 32, 32 of the lower reception case portion 29 are engaged with the engagement channels 31, 31 of the upper reception case portion 30 respectively. Further, a tube restraint protrusion 33 disposed between the right and left side wall portion is provided at the deepest position from the inner rotary portion 26 of the lower reception case portion 29.

On both outer side surfaces of the lower reception case portion 29 provided are lock arm reception portions (locking means) 35, 35, and on both outer side surfaces of the upper reception case portion 30 provided are lock arm portions (locking means) 36, 36. Accordingly, the assembled state of the base member 24 and the cover 25 is tightly fixed through the lock arm portions 36, 36 being locked in the lock arm reception portions 35, 35 respectively.

Figure 7:
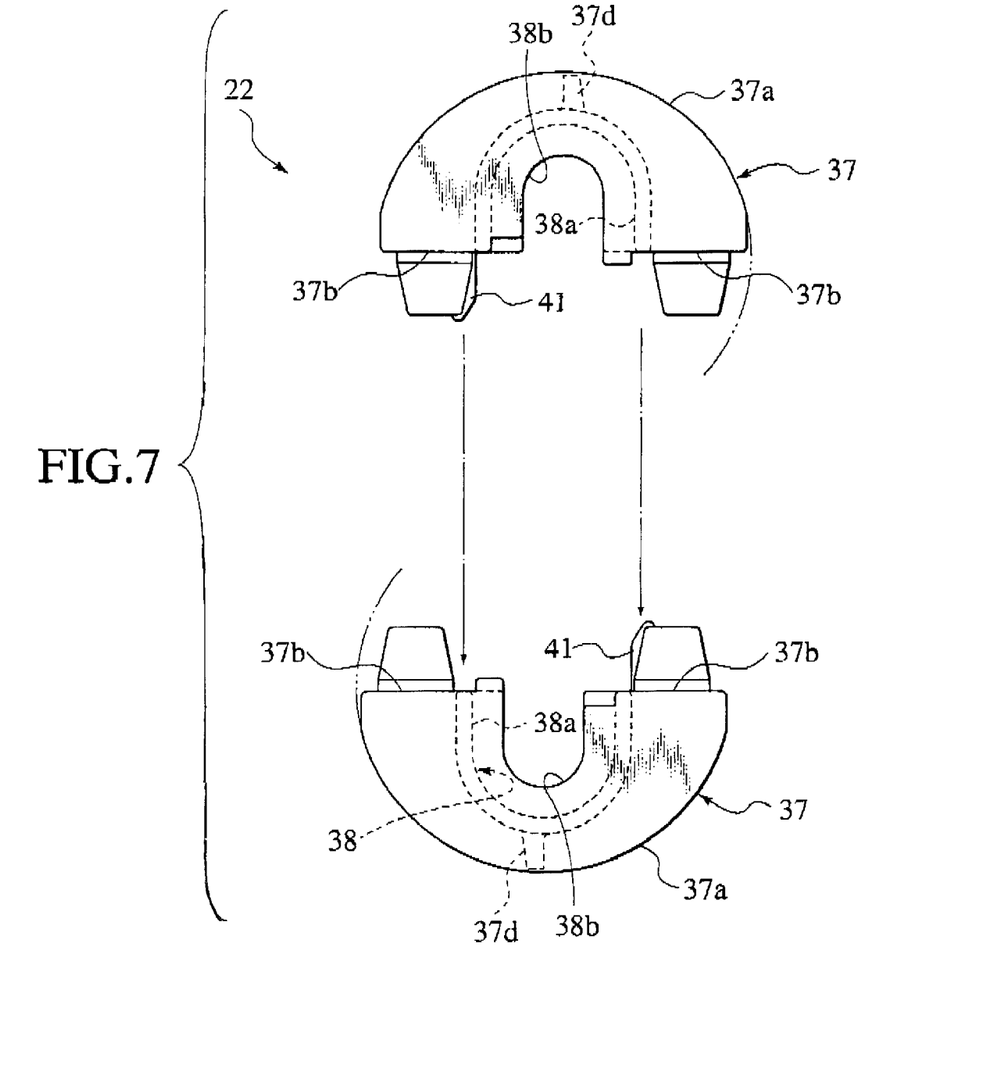
FIG. 7 is an exploded front view of an embodiment of the inner rotary bodies according to the present invention.

As shown in FIG. 5 and FIG. 7, the inner rotary body 22 with a round arch surface 37a formed on its outer circumference is composed of a pair of divided rotary members 37, 37. By butting butt surfaces 37b, 37b of a pair of the divided rotary members 37, 37 assembled is the inner rotary body 22. Under the condition where the divided rotary members 37, 37 are attached, a tube receptacle 38 is formed within the inner rotary body 22. A plurality of protrusions 38a are formed as the integral parts in the tube receptacle 38. By each protrusion 38a held is each indentation 23a of the corrugated tube 23 in which contains the wire harness W. Since the corrugated tube 23 is a tube with an elliptic cross-section made of synthetic resin and has a bellows-like uneven surface on its outer circumference, it can wind and bend with ease.

Further, on one wall of right and left outer walls of the divided rotary members 37, 37 provided is a yoke-like lock arm portion (locking means) 41, and on the other wall provided is a hook-like lock arm reception portion (locking means) 42 in which the lock arm portion 41 is locked. By locking the lock arm portion 41 in the lock arm reception portion 42, the assembled state of the divided rotary members 37, 37 is tightly fixed.

As shown in FIG. 5, a flange portion 37c in the shape of a round arch provide at one end of each divided rotary member 37 is received between a pair of flange portions 26a, 26a in the shape of a round arch formed protruding at one end of the inner rotary chamber 26. Further, through striking of a protrusion 37d protruding from the center of each divided rotary member 37 against a protrusion portion 26d protruding from the inner rotary chamber 26, the inner rotary body 22 rotates within the rotation angle of 180°. Each indentation 23a of the corrugated tube 23 with the elliptic cross-section is locked in a plurality of protrusion portions 38a protruding from the tube receptacle 38 of each divided rotary member 37. And further, the corrugated tube 23 appears outside of the protrusion portion 38a provided at one end of each divided rotary member 37. Moreover, a harness reception opening 38b being a U-channel is provided at the other end of each divided rotary member 37, and the wire harness W appearing from the corrugated tube received in the interior of the tube receptacle 38 appears outside of the outer fixing body 21 via the harness reception opening 38a and via the harness support portion 27 of the base member 24.

When a wiring path of the corrugated tube 23 is varied due to opening and closing motion of the sliding door under the above configuration, movement of the corrugated tube 23 is restrained by the tube bend restraint portion 28 of the outer fixing body 21. Thereby, the corrugated tube 23, as shown by the arrow in FIG. 8B, rotates and bends within the interior of the tube bend restraint portion 28 sliding on the inner surface of the tube bend restraint portion 28. Concretely, the corrugated tube 23 slides on the inner surface of the side surface portion 28b, 28c of the tube bend restraint portion 28, and its large movement (in the direction of X-axis) is restrained by the tube restraint protrusion 33 provided between the side surface portion 28b, 28c. According to such movement of the corrugated tube 23, the sliding door is opened and closed smoothly, and damage of the corrugated tube 23 and the wire harness W received in the interior of the corrugated tube 23 is also reduced during opening and closing the sliding door.

In the present embodiment, the tube slide area 50 is formed only inside of the tube bend restraint portion 28a–28c of the cover 25. Therefore, in sliding movement of the corrugated tube 23, there is no indentation portions (sharp edge portion) formed at the site where the butt surface 29a of the base member 24 is engaged with the butt surface 30a of the cover 25 in the tube slide area, which is the inner surface of the tube bend restraint portion 28. Consequently, it never occurs that the corrugated tube 23 may strike against an indentation portion formed at the site where the butt surfaces 29a and 30a are engaged, and the corrugated tube 23 can always move smoothly within the tube bend restraint portion 28 of the outer fixing body 21.

In this embodiment, since the engagement channel 31 is formed as one-piece in the cover 25 forming the tube slide area 50 of the tube bend restraint portion 28, and since the engagement protrusion 32 to be engaged with the engagement channel 31 is formed as one-piece in the base member 24 not forming the tube slide area 50 of the tube bend restraint portion 28, the assembled state of the base member 24 and the cover 25 can be tightened.

Additionally in the present embodiment, the cover 25 is chosen for a member where the tube slide area of the tube bend restraint portion 28 is to be formed, and the base member 24 is chosen for a member where the tube slide area of the tube bend restraint portion 28 is not to be formed. However, the base member 24 cover can be chosen for the member where the tube slide area of the tube bend restraint portion 28 is to be formed, and the cover 25 can also be chosen for the member where the tube slide area of the tube bend restraint portion 28 is not to be formed. Further, the rotary holder for corrugated tube is used at the site where the wire harness W on the vehicle body side is wired up to that on the sliding door side, sites where it is to be used are not confined thereto. Moreover, the present rotary holder for corrugated tube 20 is provided with the tube bend restraint portion 28 only for one end portion, however the tube bend restraint portion 28 can be provided for each end portion on both sides. Still further, the corrugated tube 23 should not be confined to those of a flat type with an elliptic cross-section, but can be those of a cylinder type with a circular cross-section.

What is claimed is:

1. A rotary holder for corrugated tube, comprising:
   an outer fixing body formed by assembling a cover portion member onto a base member, receiving rotatablly a corrugated tube; and
   a tube bend restraint portion provided at the end portion of the outer fixing body for restraining a bend of the corrugated tube within a given range; wherein
   a tube slide area in which the corrugated tube slides on an inner surface of the tube bend restraint portion is formed only in either the base member or the cover portion.

2. The rotary holder for corrugated tube described in claim 1, wherein an engagement channel is formed in the tube bend restraint portion of one member where the tube slide area is to be formed, and an engagement protrusion to be engaged with the engagement channel is formed in the other member where the tube slide area is not to be formed.

3. The rotary holder for corrugated tube described in claim 2, wherein the member where the tube slide area is to be formed is the cover portion, and the member where the tube slide area is not to be formed is the base member.

* * * * *

UNITED STATES PATENT AND TRADEMARK OFFICE
CERTIFICATE OF CORRECTION

PATENT NO. : 6,668,865 B2  
DATED : December 30, 2003  
INVENTOR(S) : Masaji Miyamoto et al.

It is certified that error appears in the above-identified patent and that said Letters Patent is hereby corrected as shown below:

Column 6,
Lines 36-37, "rotatablly" should read -- rotatably --.

Signed and Sealed this

Twenty-second Day of June, 2004

JON W. DUDAS
*Acting Director of the United States Patent and Trademark Office*